(12) United States Patent
Baik et al.

(10) Patent No.: US 11,876,461 B2
(45) Date of Patent: Jan. 16, 2024

(54) POSITIVELY-CHARGED BODY FOR TRIBOELECTRIC GENERATOR AND TRIBOELECTRIC GENERATOR INCLUDING THE SAME

(71) Applicant: RESEARCH & BUSINESS FOUNDATION SUNGKYUNKWAN UNIVERSITY, Suwon-si (KR)

(72) Inventors: Jeong Min Baik, Yongin-si (KR); Jin Kyeom Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 169 days.

(21) Appl. No.: 17/495,946

(22) Filed: Oct. 7, 2021

(65) Prior Publication Data

US 2022/0115962 A1 Apr. 14, 2022

(30) Foreign Application Priority Data

Oct. 8, 2020 (KR) .......................... 10-2020-0129839

(51) Int. Cl.
*H02N 1/04* (2006.01)
(52) U.S. Cl.
CPC ..................... *H02N 1/04* (2013.01)
(58) Field of Classification Search
CPC .............. H02N 1/04; H01B 3/12; H01B 5/00
USPC .................................................. 310/309, 310
See application file for complete search history.

(56) References Cited

U.S. PATENT DOCUMENTS

2016/0336505 A1* 11/2016 Arizumi .................... H02N 1/08
2016/0359429 A1* 12/2016 Byun ........................ H02N 1/04

FOREIGN PATENT DOCUMENTS

KR 10-2016-0125276 A 10/2016
WO WO 2019073317 * 4/2019

OTHER PUBLICATIONS

Nanoscale charge transfer and diffusion at the MoS2/SiO2 interface by atomic force microscopy: contact injection versus triboelectrification (Year: 2018).*

(Continued)

*Primary Examiner* — Ahmed Elnakib
(74) *Attorney, Agent, or Firm* — NSIP Law

(57) ABSTRACT

The present invention relates to a positively-charged body for a triboelectric generator and a triboelectric generator including the same. More particularly, the present invention relates to a positively-charged body based on a two-dimensional material including silicon oxide, and to a triboelectric generator including such a positively-charged body. Thus, a conventional manner in which the positively-charged body is mainly composed of a metal thin film or polymer is not used, but the positively-charged body is made of the silicon oxide and the two-dimensional material. Thus, charge generation efficiency of the generator via contact between the positively-charged body and a negatively-charged body may be dramatically enhanced.

16 Claims, 6 Drawing Sheets

(56) References Cited

OTHER PUBLICATIONS

Xu, Rui, et al. "Nanoscale Charge Transfer and Diffusion at the MoS2/SiO2 Interface by Atomic Force Microscopy: Contact Injection Versus Triboelectrification." Nanotechnology 29.35, Jun. 21, 2018: 355701, (10 pages in English).

Park, Hyun-Woo, et al. "Electron Blocking Layer-based Interfacial Design for Highly-enhanced Triboelectric Nanogenerators." Nano Energy 50, www.elsevier.com/locate/nanoen, (2018): 9-15.

\* cited by examiner

POSITIVELY-CHARGED BODY FOR TRIBOELECTRIC GENERATOR AND TRIBOELECTRIC GENERATOR INCLUDING THE SAME

CROSS-REFERENCE TO RELATED APPLICATIONS

This application claims the benefit under 35 USC 119(a) of Korean Patent Application No. 10-2020-0129839 filed on Oct. 8, 2020, in the Korean Intellectual Property Office, the entire disclosure of which is incorporated herein by reference for all purposes.

BACKGROUND

Field

The present disclosure relates to a positively-charged body for a triboelectric generator and a triboelectric generator including the same. More particularly, the present disclosure relates to a positively-charged body based on a two-dimensional material including silicon oxide, and to a triboelectric generator including such a positively-charged body.

Description of Related Art

A triboelectric generator is an energy harvesting device that generates electric energy using a charge migration phenomenon that occurs when two charged bodies rub against each other. The triboelectric generator has high energy conversion efficiency, and thus may obtain high output using a small external force. In addition, the triboelectric generator has no temporal and spatial limitations compared to energy harvesting devices using heat or sun light, and continuously generates electrical energy, compared to energy harvesting devices using piezoelectric materials that generate electrical energy via deformation of materials.

The triboelectric generator uses electrostatic properties of two materials with different triboelectric properties to harvest energy. The triboelectric generator may not cause environmental pollution factor because the triboelectric generator generates electricity via friction and movement that occurs in everyday life. Internet of Things (IoT), AI, and miniaturization of electronic devices are meaningful in that people may easily carry the device and add various functions to a narrow space. Realization of maximum output in a minimum area is necessary for growth of related industrial markets and market expansion of portable devices such as smartphones and smart watches.

When two materials with triboelectric properties are in contact with each other, improved values of high voltage and current may be obtained based on surface properties. A structure of an element may be controlled and then transport characteristics of electrons or holes based on a contact surface area at an interface may be analyzed. Thus, materials and structures to increase the mobility of electrons or holes and to allow easy movement of a large amount of electrons or holes may be produced. Currently, it is difficult to apply the triboelectric generator to real life because an output value and current strength generated by the triboelectric generator are low. Because output of energy from the triboelectric generator is not constant and not continuous, the triboelectric generator does not generate an amount of the energy required to allow the user to conveniently use electronic devices in daily life.

Currently, positively-charged bodies employ metals such as Al and Ni or polymers such as nylon. Most of material studies have been conducted mainly on negatively-charged bodies. Because the output or current strength of the triboelectric generator reported so far is not noticeable, a breakthrough is needed in improving the output of the generator through development of a new positively-charged body rather than the existing negatively-charged body.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to design a charged body based on reinterpretation of a correlation between an output and a charge transfer determinant, and based on a new determinant in order to increase charging ability between charged bodies as challenge in implementing a high-power generator.

A purpose of the present disclosure is to provide a positively-charged body with dramatically improved charge generation efficiency, and a practical triboelectric generator including the same to supply power to electronic devices.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a positively-charged body for a triboelectric generator, wherein the positively-charged body comprises: a first electrode; a silicon oxide layer formed on the first electrode; and a two-dimensional material layer formed on the silicon oxide layer.

In one implementation of the first aspect, the first electrode includes a mesh electrode.

In one implementation of the first aspect, the two-dimensional material layer is made of a transition metal chalcogenide-based material or rGO (reduced graphene oxide).

In one implementation of the first aspect, a thickness of the silicon oxide layer is 200 nm or smaller.

A second aspect of the present disclosure provides a positively-charged body for a triboelectric generator, wherein the positively-charged body comprises: a first electrode; a silicon layer formed on the first electrode; a silicon oxide layer on the silicon layer; and a two-dimensional material layer formed on the silicon oxide layer.

In one implementation of the second aspect, the first electrode includes a mesh electrode.

In one implementation of the second aspect, the two-dimensional material layer is made of a transition metal chalcogenide-based material or rGO (reduced graphene oxide).

In one implementation of the second aspect, a thickness of the silicon oxide layer is 200 nm or smaller.

A third aspect of the present disclosure provides a triboelectric generator comprising: a positively-charged body including a first electrode; a silicon oxide layer formed on the first electrode; and a two-dimensional material layer formed on the silicon oxide layer; a negatively-charged body disposed above two-dimensional material layer such that the negatively-charged body and the two-dimensional material layer contact or is removed from each other; and a second electrode disposed on the negatively-charged body and opposite to the first electrode.

In one implementation of the third aspect, the first electrode includes a mesh electrode.

In one implementation of the third aspect, the two-dimensional material layer is made of a transition metal chalcogenide-based material or rGO.

In one implementation of the third aspect, a thickness of the silicon oxide layer is 200 nm or smaller.

A fourth aspect of the present disclosure provides a triboelectric generator comprising: a positively-charged body including a first electrode; a silicon layer formed on the first electrode; a silicon oxide layer on the silicon layer; and a two-dimensional material layer formed on the silicon oxide layer; a negatively-charged body disposed above two-dimensional material layer such that the negatively-charged body and the two-dimensional material layer contact or is removed from each other; and a second electrode disposed on the negatively-charged body and opposite to the first electrode.

In one implementation of the fourth aspect, the first electrode includes a mesh electrode.

In one implementation of the fourth aspect, the two-dimensional material layer is made of a transition metal chalcogenide-based material or rGO.

In one implementation of the fourth aspect, a thickness of the silicon oxide layer is 200 nm or smaller.

In accordance with the present disclosure, a conventional manner in which the positively-charged body is mainly composed of a metal thin film or polymer is not used, but the positively-charged body is made of the silicon oxide and the two-dimensional material such as $WTe_2$ and $MoS_2$. Thus, charge generation efficiency of the generator via contact with polytetrafluoroethylene (PTFE), etc. may be dramatically enhanced. Thus, a current value and output value from the triboelectric generator may be improved.

In addition, the triboelectric generator may have high applicability not only to an energy source but also to various sensor fields such as a contact sensors and medical application sensors. Thus, the triboelectric generator may greatly contribute to individual/public safety-related industries that have emerged as a major social issue.

In addition to the effects as described above, specific effects in accordance with the present disclosure will be described together with following detailed descriptions for carrying out the disclosure.

DETAILED DESCRIPTIONS

Figure 1:
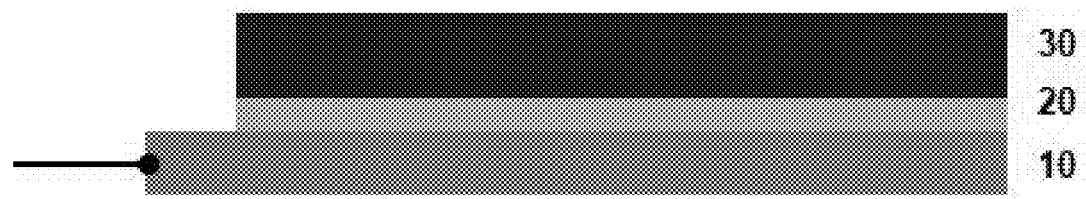
FIG. 1 shows a positively-charged body for a triboelectric generator according to an embodiment of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a positively-charged body including silicon oxide and a two-dimensional material, and to a triboelectric generator including such a positively-charged body.

The present disclosure relates to a positively-charged body which generates positive charges via contact, and which includes silicon oxide and a two-dimensional material, unlike the conventional metal or polymer-based positively-charged body.

The present disclosure provides a triboelectric generator including a positively-charged body including silicon oxide and a two-dimensional material, and a negatively-charged body such that the charge generation efficiency may be dramatically improved via contact between the negatively-charged body and the positively-charged body.

FIG. 1 shows a positively-charged body for a triboelectric generator according to an embodiment of the present disclosure.

A positively-charged body for a triboelectric generator according to an embodiment of the present disclosure shown in FIG. 1 includes a first electrode 10; a silicon oxide layer 20; and a two-dimensional material layer 30.

The first electrode 10 may be embodied as an electrode structure made of a conductive material and may serve as a substrate. Alternatively, a separate substrate may be additionally disposed. The first electrode may be made of any material that may be used as an electrode, for example, Ni, Al, etc.

In one example, a mesh-shaped electrode may be used as the first electrode. When the mesh-shaped electrode is used as the first electrode, electrical efficiency may be further increased because a surface area thereof is increased.

The silicon oxide layer 20 may be disposed on the first electrode 10 and may be made of a material such as $SiO_x$. The silicon oxide layer may be embodied as a silicon oxide thin film grown thermally on silicon, or may be embodied as silicon oxide nanoparticles made of TEOS or the like. The silicon oxide layer may take various forms such as thin films and nanoparticles. The silicon oxide layer may be formed, for example, using thermal oxidation and sol precipitation. Generally, the silicon oxide layer may be coated on a conductive material such as Ni-mesh or Al as a material of the electrode.

A thickness of such a silicon oxide layer is preferably 200 nm or smaller. When the thickness of the silicon oxide layer exceeds 200 nm, the electric efficiency may decrease due to decrease in charge trapping ability. The thickness of the silicon oxide layer is more preferably 100 nm or smaller.

The silicon oxide layer may allow the charge trapping ability to be improved, thereby providing a triboelectric generator having high efficiency compared to the conventional triboelectric generator.

The two-dimensional material layer 30 may be disposed on the silicon oxide layer 20. The two-dimensional material layer may be made of a transition metal chalcogenide-based material or rGO (reduced graphene oxide).

For example, the transition metal chalcogenide-based material may include one of transition metals such as Mo, W, Nb, V, Ta, Ti, Zr, Hf, Tc, and Re and one chalcogen element such as S, Se, and Te. The transition metal chalcogenide-based material may be expressed as $MX_2$ (where, M refers to the transition metal and X refers to the chalcogen element). Thus, the transition metal chalcogenide-based material may include, for example, $MoS_2$, $MoSe_2$, $MoTe_2$, $WS_2$, $WSe_2$, $WTe_2$, $ZrS_2$, $ZrSe_2$, $HfS_2$, $HfSe_2$, $NbSe_2$, $ReSe_2$, etc.

In accordance with the present disclosure, the two-dimensional material layer may allow surface charge transfer ability to be improved, and thus high voltage, current, and charge density may be obtained from the triboelectric generator.

The two-dimensional material may be produced using chemical vapor deposition (CVD) or hydrothermal synthesis and may include $WTe_2$, rGO, $MoS_2$, and $WS_2$. In the CVD method, a material to be deposited on a substrate is injected into a reaction chamber as a gas in a gaseous state rather than a solid state and is deposited on the substrate via high-temperature decomposition or high-temperature chemical reaction in the reaction chamber. $WTe_2$ may be deposited using CVD. The hydrothermal synthesis refers to a process of synthesizing a material using water or aqueous solution under high temperature and pressure. rGO, $MoS_2$, and $WS_2$ materials may be produced. The two-dimensional material may be embodied as a semiconductor such as $WTe_2$, rGO, $MoS_2$, and $WS_2$, and may be formed using CVD or hydrothermal synthesis, and may be coated or deposited on the silicon oxide layer and may have a thickness of 100 nm or smaller.

Figure 2:
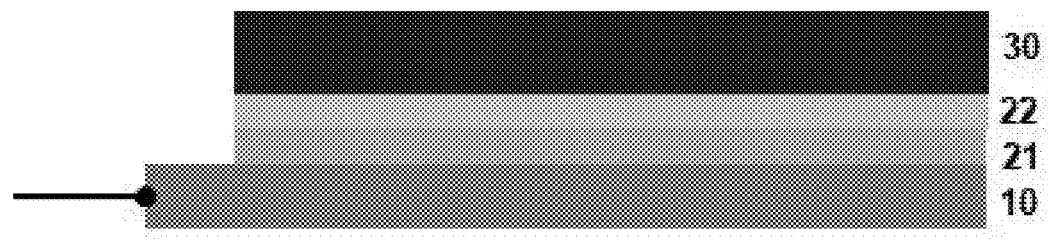
FIG. 2 shows a positively-charged body for a triboelectric generator according to a further embodiment of the present disclosure.

FIG. 2 shows a positively-charged body for a triboelectric generator according to a further embodiment of the present disclosure.

A positively-charged body for a triboelectric generator according to the further embodiment of the present disclosure shown in FIG. 2 may include a first electrode 10; a silicon layer 21; a silicon oxide layer 22; and a two-dimensional material layer 30.

A difference of this embodiment from the embodiment of FIG. 1 is that in FIG. 1, the silicon oxide layer 20 is replaced with a combination of the silicon layer 21 and the silicon oxide layer 22 in FIG. 2. Thus, repeated descriptions of those as described above will be omitted.

In this embodiment, a thickness of the silicon oxide layer 22 may be preferably 200 nm or smaller. In this case, when the thickness thereof exceeds 200 nm, charges may not move freely, and thus electrical efficiency of the generator may be reduced. The thickness of the silicon oxide layer is more preferably 100 nm or smaller In the above descriptions, the positively-charged body has been described. Hereinafter, a triboelectric power generation device, that is, a triboelectric generator using the above positively-charged body will be described. In this case, repeated descriptions of those as described above will be omitted.

The triboelectric generator according to an embodiment of the present disclosure may include the positively-charged body shown in FIG. 1 as a positively-charged body. Specifically, the triboelectric generator according to an embodiment of the present disclosure may include the positively-charged body including the first electrode; the silicon oxide layer formed on the first electrode; and the two-dimensional material layer formed on the silicon oxide layer; a negatively-charged body disposed above the two-dimensional material layer; and a second electrode formed on the negatively-charged body, wherein the positively-charged body and the negatively-charged body contact or is removed from each other.

In addition, the triboelectric generator according to an additional embodiment of the present disclosure may include the positively-charged body shown in FIG. 2 as a positively-charged body. Specifically, the triboelectric generator according to an embodiment of the present disclosure may include the positively-charged body including the first electrode; the silicon layer formed on the first electrode; the silicon oxide layer formed on the silicon layer; and the two-dimensional material layer formed on the silicon oxide layer; a negatively-charged body formed on the two-dimensional material layer; and a second electrode formed on the negatively-charged body, wherein the positively-charged body and the negatively-charged body contact or is removed from each other.

The negatively-charged body may include PFA, PTFE (Polytetrafluoroethylene), polytetrafluoroethylene (Teflon), polydimethylsiloxane (PDMS), fluorinated ethylene propylene (FEP), poly(methyl methacrylate) (PMMA), polyvinylidene fluoride (PVDF), polycarbonate (PC), polyvinyl chloride (PVC), polyimide (Kapton), polypropylene (PP), polyethylene (PE), or polystyrene (PS).

The second electrode may be disposed on the negatively-charged body, and the second electrode may be made of any material that may be used for an electrode.

The pair of the positively-charged body and the negatively-charged body may constitute the triboelectric generator to generate and induce triboelectricity and/or static electricity via contact therebetween, so that an electron moves and an electric current flow.

Figure 3:
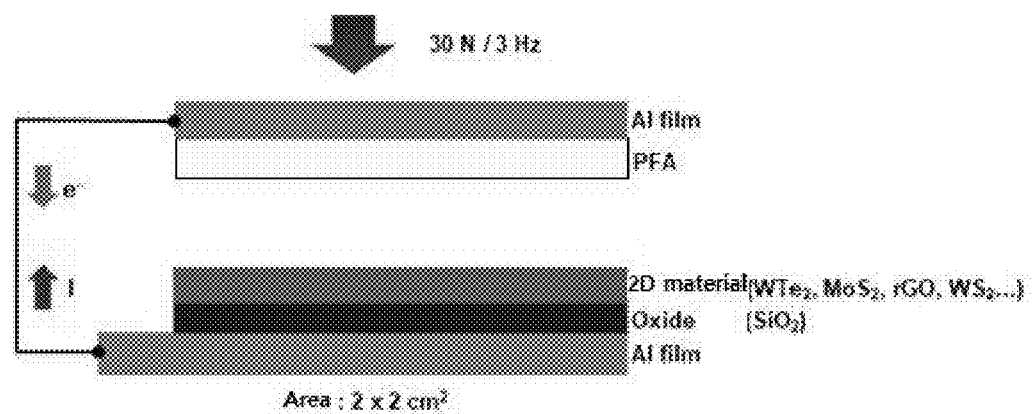
FIG. 3 shows an example of a triboelectric generator according to an embodiment of the present disclosure.
Figure 4:
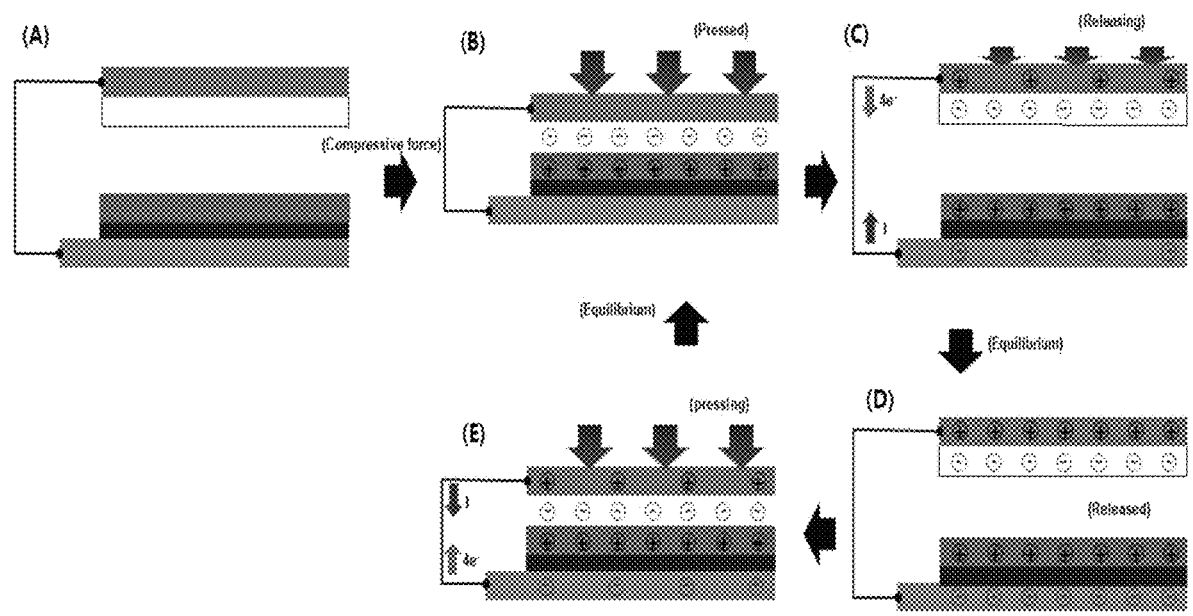
FIG. 4 shows a working principle of a triboelectric generator according to an embodiment of the present disclosure.

FIG. 3 shows an example of a triboelectric generator according to an embodiment of the present disclosure, and FIG. 4 shows a working principle of a triboelectric generator according to an embodiment of the present disclosure.

In FIG. 3 and FIG. 4, the triboelectric generator is shown in a push type, but this is only an example. The disclosure is not limited thereto. The triboelectric generator of any type of a sliding type, a rotation type, etc., may be composed of the pair of the positively-charged body according to the present disclosure and the negatively-charged body.

In (a) of FIG. 4, a compressive force is applied to the generator. Thus, the positively-charged body and the negatively-charged body are in close contact with each other (pressed) in (b) of FIG. 4. Thus, the triboelectric effect occurs. Thus, PFA becomes negatively charged and the two-dimensional material becomes positively charged.

In (c) of FIG. 4, the positively-charged body and the negatively-charged body are removed from each other (releasing). Thus, due to electrostatic induction, electrons move due to electrostatic induction and the current flows in one direction.

In (d) of FIG. 4, the positively-charged body and the negatively-charged body are completely removed from each other. Thus, electrical equilibrium may be achieved.

In (e) of FIG. 4, a compressive force is again applied to the generator. Thus, the positively-charged body and the negatively-charged body are in close contact with each other. Thus, electrons move again due to electrostatic induction and the current flows in the opposite direction.

When the triboelectric generator is manufactured as in the example of FIG. 4, an amount of charges flowing to an external circuit was measured as 800 $\mu C/m^2$, which was 3 to 4 times higher than an amount (200 to 300 $\mu C/m^2$) of charges generated from the conventional triboelectric generator.

Hereinafter, the present disclosure will be additionally described along with specific examples.

EXAMPLE 1

Example 1 relates to a positively-charged body of a two-dimensional material/$SiO_2$/Si/Al structure.

1) $WTe_2$ as the two-dimensional material is synthesized using CVD, and a synthesis conditions are as follows.

A transition metal layer is deposited on a wafer using a magnetron sputter. Chalcogen powders as a precursor are placed on a heating jacket and the jacket is heated such that a temperature thereof is raised up to about 500° C. in an environment where Ag gas flows.

The heating is carried out such that the temperature of the jacket is higher than a eutectic point (about 449° C.) of the precursor such that an amount of Te of the chalcogen powder is sufficient and thus diffuses along with carrier gas. A transition metal in a center of a reactor moves onto a deposited p-Si wafer and grows as $WTe_2$ thereon. This state is kept for at least 24 hours so that an entirety of the transition metal has undergone reaction. A uniform TMDC film of a large area is grown using the above method.

2) A two-dimensional $MoS_2$ synthesis method is as follows.

A three neck flask is placed on a heating mantle and a nitrogen atmosphere is created. After maintaining the flask at 100 degrees C., 2 mmol of $(NH_4)2MoS_4$ and 80 mL oleylamine are input into the flask and a mixture is stirred.

Thereafter, the heating mantle temperature is raised up to 360 degrees C., and the temperature is maintained at 360 degrees C. so that the synthesis occurs well. The reactor is cooled down to room temperature, such that a black material is produced. It is confirmed using XRD that the synthesized two-dimensional material is $MoS_2$. It is confirmed based on a SEM photograph that each layer is composed of the two-dimensional material. The produced $MoS_2$ is spin-coated on $SiO_2$/Si at varying rpm to fabricate devices having various thicknesses.

EXAMPLE 2

Example 2 relates to a positively-charged body of a $MoS_2/SiO_2$ nanoparticles/Ni mesh structure.

1) The silicon oxide nanoparticles are produced as follows.

$NH_4OH$ and ethanol are inputted to a four neck flask and sonication is carried out for 10 min. TEOS (208 g/mol) is inputted into a syringe (10 ml). A magnetic bar is inputted into the flask containing $NH_4OH$ and Ethanol for reaction. Stirring is continuously performed at 300 rpm until the solution starts to become opaque.

Si—OR of TEOS is replaced with SiOH via OH— of $NH_4OH$ (hydrolysis), and SiOH is connected to SiOH, resulting in Si—OH—Si bonding. The solution is transferred to a conical tube (5 ml) by 4 ml and centrifugation (14000 rpm for 10 min) is carried out to collect $SiO_2$ particles. Washed $SiO_2$ particles are dried in a 60 degrees C. oven for 10 hours and then grinded with a mortar.

2) $MoS_2$ coating $MoS_2$ is coated on $SiO_2$.

EXAMPLE 3

Example 3 describes a process for manufacturing and evaluating a triboelectric generator. The manufacturing process of the triboelectric generator is as follows.

The process of manufacturing a triboelectric generator based on the positively-charged body of the two-dimensional material/$SiO_2$/Si/Al structure is as follows. $MoS_2$ is synthesized, and then is spin-coated on a wafer. The spin coating is executed at a rpm 3000 for 40 seconds to form a film with a thickness of 50 nm. An Al film as an electrode is placed on an acrylic plate. The wafer on which $MoS_2$ is formed is placed on the Al film to manufacture the positively-charged body. The negatively-charged body is embodied as a PFA film. An Al film on an acrylic plate is embodied as a second electrode. The second electrode is attached to the PFA film. Thus, the triboelectric generator has been manufactured.

The process of manufacturing a triboelectric generator based on the positively-charged body of the $MoS_2/SiO_2$ nanoparticles/Ni mesh structure. $SiO_2$ nanoparticles are input in ethanol to produce a 10 wt % $SiO_2$ solution. Sonication is carried out for 10 minutes. The Ni mesh is immersed in the solution such that the $SiO_2$ nanoparticles are uniformly stacked on the mesh. Annealing is carried out for 10 minutes at 60° C. on a hot plate. Then, $MoS_2$ is synthesized, and then is spin-coated thereon. The spin coating is executed at rpm 3000 for 40 seconds to produce a film with a thickness of 50 nm. The negatively-charged body is embodied as a PFA film. An Al film on an acrylic plate is embodied as a second electrode. The second electrode is attached to the PFA film. Thus, the triboelectric generator has been manufactured.

2) Results of measuring amount of charges

Figure 5A:
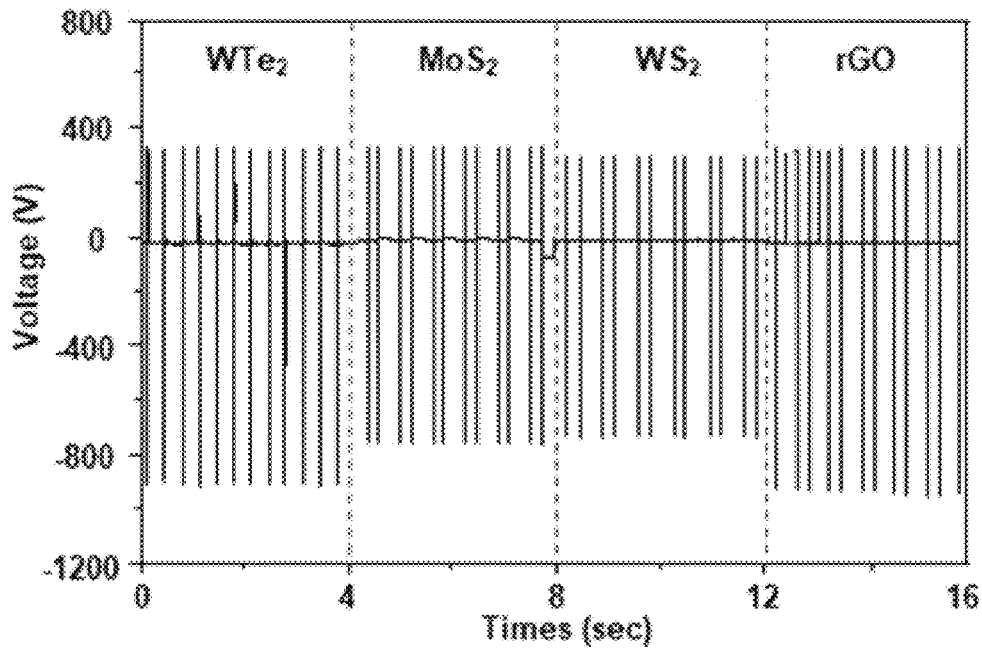
FIG. 5A to 5C show output voltage (5A), output current (5B), and surface charge density (5C) of a bilayer TENG based on each of $WTe_2$, $MoS_2$, $WS_2$, and rGO as a two-dimensional material of a positively-charged body.
Figure 5B:
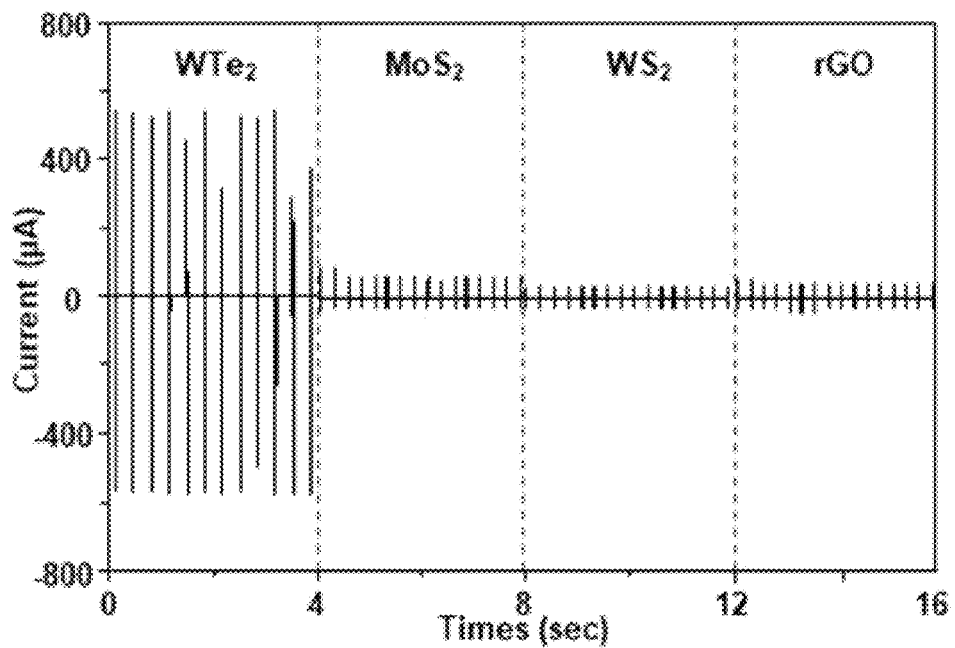
Figure 5C:
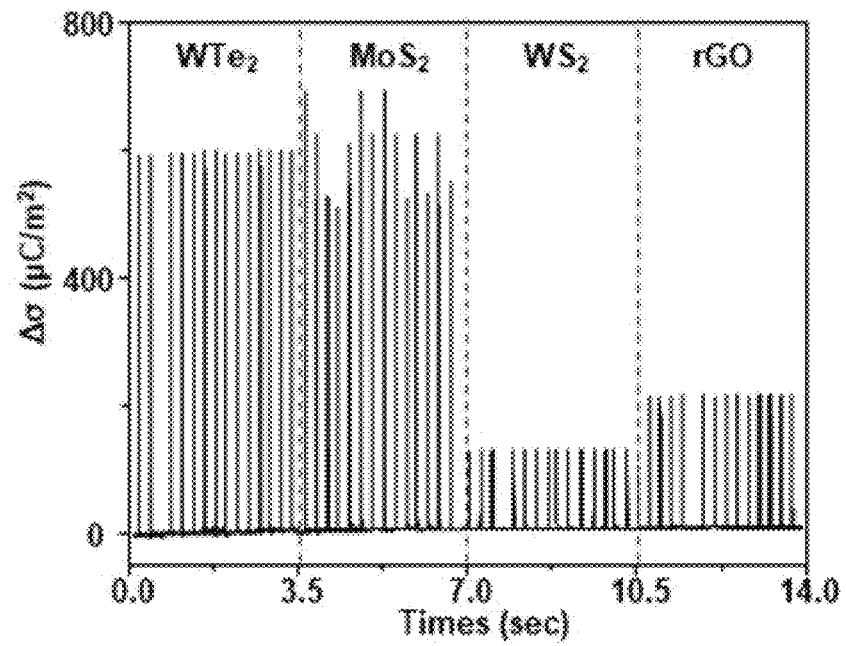

Triboelectric generator based on positively-charged body of two-dimensional material/$SiO_2$/Si/Al structure Each of $WTe_2$, $MoS_2$, $WS_2$, and rGO was used as the two-dimensional material of the positively-charged body, and the negatively-charged body was made of PFA. The output voltage, output current, and surface charge density each of thereof were measured at 30 N and 3 Hz. The surface charge density when using $MoS_2$ was 750 $\mu C/m^2$, which was the highest value among those when using $WTe_2$, $MoS_2$, $WS_2$, and rGO. The measurements when using $WTe_2$, $MoS_2$, $WS_2$, and rGO were higher than those as reported when using a conventional two-layer TENG structure. These measurements are shown in FIG. 5. FIG. 5 shows output voltage (5A), output current (5B), and surface charge density (5C) of a bilayer TENG based on each of $WTe_2$, $MoS_2$, $WS_2$, and rGO as a two-dimensional material of a positively-charged body.

Figure 6A:
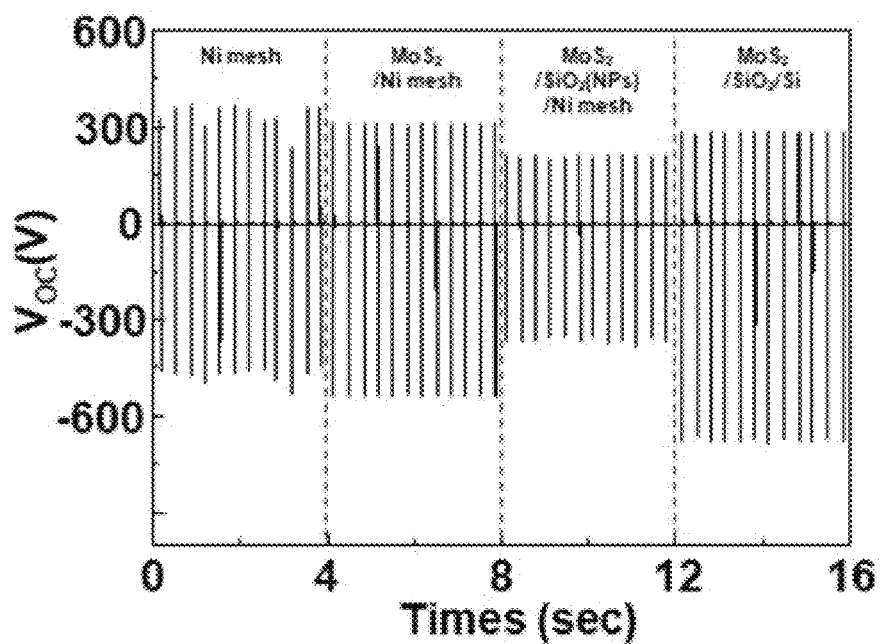
FIG. 6A to 6C show output voltage (6A), output current (6B), and surface charge density (6C) of a bilayer TENG based on each of Ni mesh, $MoS_2$/Ni mesh, $MoS_2$/$SiO_2$ nanoparticles/Ni mesh, and $MoS_2$/$SiO_2$/Si.
Figure 6B:
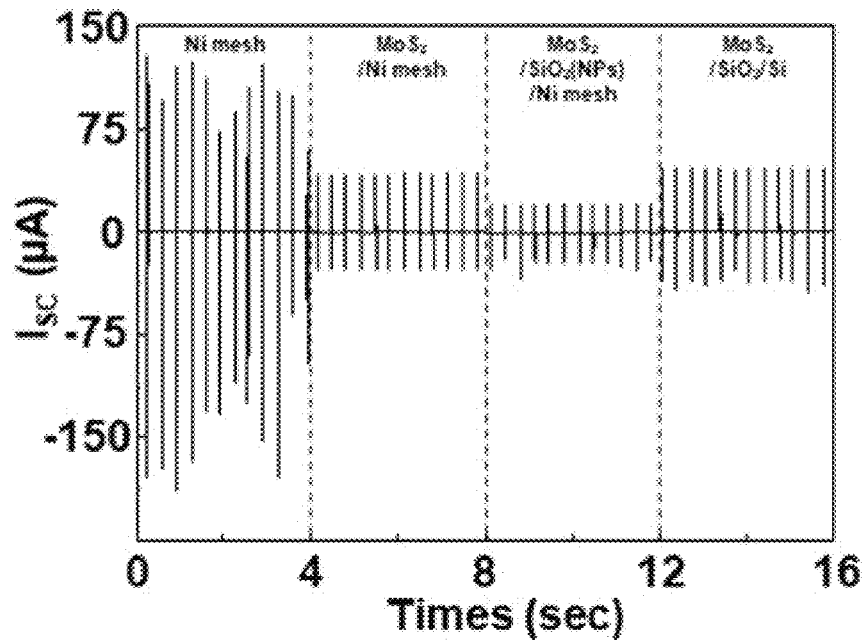
Figure 6C:
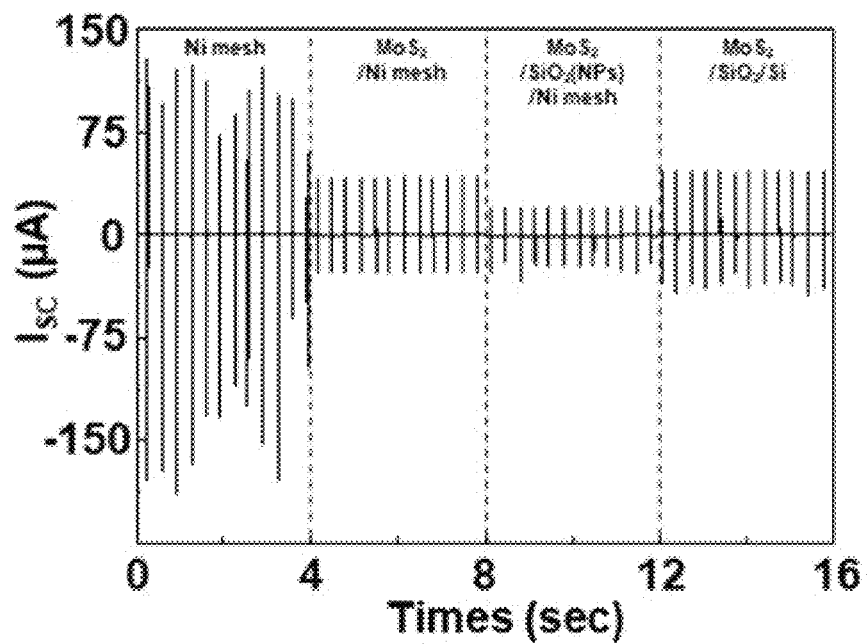
Figure 7:
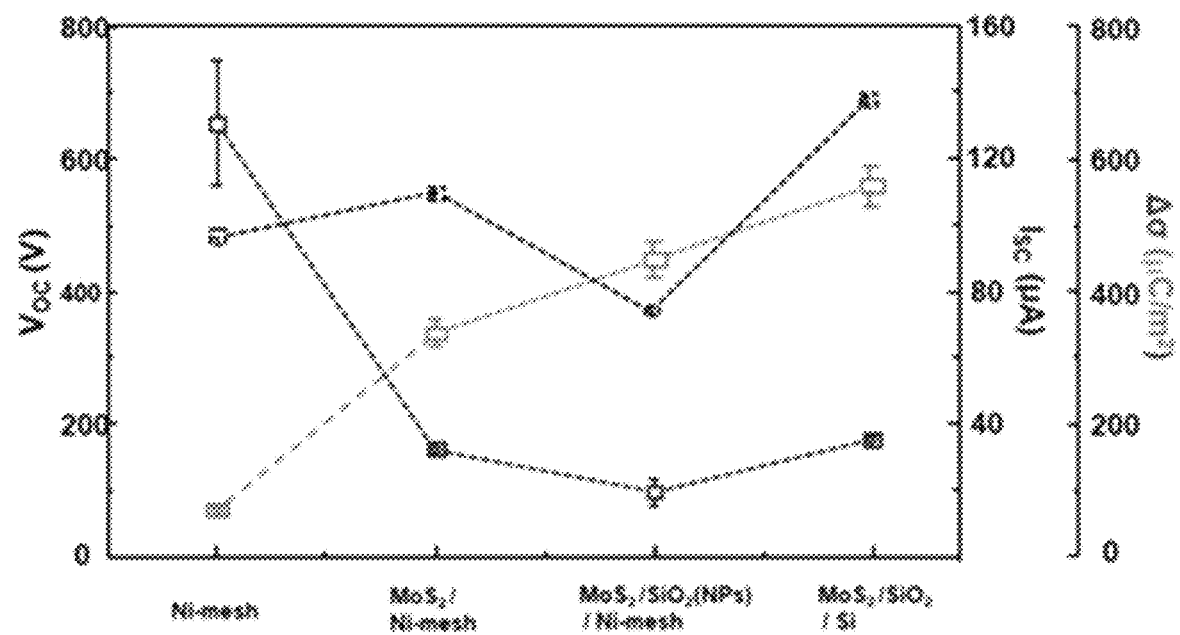
FIG. 7 shows that higher output voltage/output current/surface charge density was achieved using the TENG according to the present disclosure.

Triboelectric generator based on positively-charged body of $MoS_2/SiO_2$ nanoparticles/Ni mesh structure The measured values related to the corresponding triboelectric generator are shown in FIG. 6 and FIG. 7. FIG. 6 show output voltage (6A), output current (6B), and surface charge density (6C) of a bilayer TENG based on each of Ni mesh, $MoS_2$/Ni mesh, $MoS_2/SiO_2$ nanoparticles/Ni mesh, and $MoS_2/SiO_2$/Si.

As shown in FIG. 6 and FIG. 7, it was identified that higher output voltage/output current/surface charge density were achieved using the TENG according to the present disclosure.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A positively-charged body for a triboelectric generator, the positively-charged body comprising:
    a first electrode;
    a silicon layer formed on the first electrode;
    a silicon oxide layer formed on the silicon layer; and
    a two-dimensional material layer formed on the silicon oxide layer,
    wherein the first electrode comprises a conductive material and is connectable to a second electrode included in a negatively-charged body of the triboelectric generator,
    wherein, in a first position, the two-dimensional material layer is in contact with the negatively-charged body, and
    wherein, in a second position, the two-dimensional material layer is not in contact with the negatively-charged body.

2. The positively-charged body of claim 1, wherein the first electrode includes a mesh electrode.

3. The positively-charged body of claim 1, wherein the two-dimensional material layer comprises a transition metal chalcogenide-based material or rGO (reduced graphene oxide).

4. The positively-charged body of claim 1, wherein a thickness of the silicon oxide layer is 200 nm or smaller.

5. A positively-charged body for a triboelectric generator, the positively-charged body comprising:
a first electrode;
a silicon layer formed on the first electrode;
a silicon oxide layer formed on the silicon layer; and
a two-dimensional material layer formed on the silicon oxide layer,
wherein the first electrode is connectable to a second electrode included in a negatively-charged body of the triboelectric generator,
wherein, in a first position, the two-dimensional material layer is in contact with the negatively-charged body, and
wherein, in a second position, the two-dimensional material layer is not in contact with the negatively-charged body.

6. The positively-charged body of claim 5, wherein the first electrode includes a mesh electrode.

7. The positively-charged body of claim 5, wherein the two-dimensional material layer comprises a transition metal chalcogenide-based material or rGO (reduced graphene oxide).

8. The positively-charged body of claim 5, wherein a thickness of the silicon oxide layer is 200 nm or smaller.

9. A triboelectric generator comprising:
a positively-charged body including:
a first electrode;
a silicon layer formed on the first electrode;
a silicon oxide layer formed on the silicon layer;
a two-dimensional material layer formed on the silicon oxide layer; and
a negatively-charged body including a second electrode opposite to the first electrode,
wherein the first electrode comprising a conductive material and the second electrode are connected,
wherein, in a first position, the two-dimensional material layer is in contact with the negatively-charged body, and
wherein, in a second position, the two-dimensional material layer is not in contact with the negatively-charged body.

10. The triboelectric generator of claim 9, wherein the first electrode includes a mesh electrode.

11. The triboelectric generator of claim 9, wherein the two-dimensional material layer comprises a transition metal chalcogenide-based material or rGO.

12. The triboelectric generator of claim 9, wherein a thickness of the silicon oxide layer is 200 nm or smaller.

13. A triboelectric generator comprising:
a positively-charged body including:
a first electrode;
a silicon layer formed on the first electrode;
a silicon oxide layer formed on the silicon layer; and
a two-dimensional material layer formed on the silicon oxide layer; and
a negatively-charged body including a second electrode opposite to the first electrode,
wherein the first electrode and the second electrode are connected,
wherein, in a first position, the two-dimensional material layer is in contact with the negatively-charged body, and
wherein, in a second position, the two-dimensional material layer is not in contact with the negatively-charged body.

14. The triboelectric generator of claim 13, wherein the first electrode includes a mesh electrode.

15. The triboelectric generator of claim 13, wherein the two-dimensional material layer comprises a transition metal chalcogenide-based material or rGO.

16. The triboelectric generator of claim 13, wherein a thickness of the silicon oxide layer is 200 nm or smaller.

* * * * *